US012782906B2

(12) United States Patent
Henke et al.

(10) Patent No.: US 12,782,906 B2
(45) Date of Patent: Nov. 3, 2026

(54) METHOD FOR OPERATING AN AUTOMATION SYSTEM, CONTROL SYSTEM AND AUTOMATION SYSTEM

(71) Applicant: Beckhoff Automation GmbH, Verl (DE)

(72) Inventors: Christian Henke, Frastanz (AT); Michel Matuschke, Meschede (DE); Armin Pehlivan, Nüziders (AT); Gerhard Holzer, Au am Leithaberge (AT); Johannes Beckhoff, Schloß Holte-Stukenbrock (DE)

(73) Assignee: Beckhoff Automation GmbH, Verl (DE)

( * ) Notice: Subject to any disclaimer, the term of this patent is extended or adjusted under 35 U.S.C. 154(b) by 212 days.

(21) Appl. No.: 18/925,412

(22) Filed: Oct. 24, 2024

(65) Prior Publication Data

US 2025/0044763 A1 Feb. 6, 2025

Related U.S. Application Data

(63) Continuation of application No. PCT/EP2023/061324, filed on Apr. 28, 2023.

(30) Foreign Application Priority Data

May 10, 2022 (DE) .................... 10 2022 111 680.8

(51) Int. Cl.
*G05B 19/402* (2006.01)
*G05B 19/4099* (2006.01)

(52) U.S. Cl.
CPC ....... *G05B 19/402* (2013.01); *G05B 19/4099* (2013.01); *G05B 2219/37074* (2013.01)

(58) Field of Classification Search
CPC .............. G05B 19/402; G05B 19/4099; G05B 2219/37074; H02K 2201/18;
(Continued)

(56) References Cited

U.S. PATENT DOCUMENTS 10,540,918 B2 * 1/2020 Wei ......................... G06F 3/011
11,437,902 B2 * 9/2022 Brinkmann ............ B65G 54/02
(Continued)

FOREIGN PATENT DOCUMENTS

CA 2863566 A1 3/2016
CN 101510074 A 8/2009
(Continued)

OTHER PUBLICATIONS

Office Action dated Feb. 8, 2023 in connection with German patent application No. 10 2022 111 680.8, 14 pages including English translation.

(Continued)

*Primary Examiner* — Masud Ahmed
(74) *Attorney, Agent, or Firm* — Dorsey & Whitney LLP

(57) ABSTRACT

A method is provided for operating an automation system which comprises a drive system and an optical projection unit. The drive system comprises a movable rotor, where the rotor can be driven with the aid of a drive. A control system of the automation system carries out the following steps of determining a position information of a rotor, linking an object to be displayed to the rotor, rendering a projection to be displayed by the optical projection unit on the basis of the position information of the rotor and the object to be displayed, and outputting the rendered projection to the optical projection unit, so that the optical projection unit outputs the rendered projection on a surface and/or on the rotor or on a superstructure or superstructures of the rotor, and/or on transport goods of the drive system.

20 Claims, 6 Drawing Sheets

(58) Field of Classification Search
CPC .... H02K 41/031; B65G 54/02; H04N 9/3147; H04N 9/3179; H04N 9/3194
See application file for complete search history.

(56) References Cited

U.S. PATENT DOCUMENTS

| | | | | |
|---|---|---|---|---|
| 2016/0210738 | A1* | 7/2016 | Curlander | G06T 7/50 |
| 2019/0353917 | A1* | 11/2019 | Joseph | G02B 30/54 |
| 2020/0290093 | A1* | 9/2020 | Moriyama | B07C 3/14 |
| 2023/0023259 | A1* | 1/2023 | Moriyama | B07C 7/005 |
| 2023/0238868 | A1 | 7/2023 | Prüssmeier et al. | |
| 2024/0055969 | A1 | 2/2024 | Schulte et al. | |

FOREIGN PATENT DOCUMENTS

| | | | |
|---|---|---|---|
| CN | 107168534 | A | 9/2017 |
| CN | 111709157 | A | 9/2020 |
| DE | 202011107932 | U1 | 1/2012 |
| DE | 102009008529 | B4 | 11/2014 |
| DE | 102017131304 | A1 | 6/2019 |
| DE | 102020127012 | A1 | 4/2022 |
| EP | 3383595 | B1 | 9/2021 |
| EP | 4082942 | A1 | 11/2022 |
| WO | 2020043439 | A1 | 3/2020 |
| WO | 2022218952 | A2 | 10/2022 |

OTHER PUBLICATIONS

International Search Report and Written Opinion dated Aug. 1, 2023 in connection with International Patent Application No. PCT/EP2023/061324, 30 pages including English translation.
International Preliminary Report on Patentability dated Aug. 22, 2024 in connection with International Patent Application No. PCT/EP2023/061324, 42 pages including English translation.
Office Action dated Mar. 1, 2025 in connection with Chinese patent application No. 202380038105.3, 11 pages including English translation.

* cited by examiner

METHOD FOR OPERATING AN AUTOMATION SYSTEM, CONTROL SYSTEM AND AUTOMATION SYSTEM

CROSS-REFERENCE TO RELATED APPLICATIONS

This patent application is a continuation of International Patent Application No. PCT/EP2023/061324, filed Apr. 28, 2023, entitled “Method for Operating an Automation System, Control System and Automation System,” which claims the priority of German patent application DE 10 2022 111 680.8, filed May 10, 2022, entitled “Verfahren zum Betreiben eines Automatisierungssystems, Steuerungssystem und Automatisierungssystem,” each of which is incorporated by reference herein, in the entirety and for all purposes.

TECHNICAL FIELD

The invention relates to a method for operating an automation system, a control system and an automation system.

BACKGROUND

Automation systems may include drive systems for moving objects. A drive system may be used to move or position a movable element of a system, a machine, a building or a stage in at least one direction. Drive systems may comprise a permanently energized electromagnetic motor having a stator and a rotor that may move on the stator in at least one direction. In particular, the drive system may be a planar drive system in which the stator is planar and the rotor may be moved in at least two directions. The aforementioned drive systems may inter alia be used in automation technology, in particular production technology, handling technology, process technology, stage and show technology or building and catering technology.

In a permanently energized electromagnetic planar motor, a drive force is exerted upon the rotor by the fact that energized coil groups of a stator assembly interact magnetically with drive magnets of a plurality of magnet arrangements of the rotor. Planar drive systems comprising rectangular and longitudinally stretched coil groups and rectangular and longitudinally stretched magnet arrangements of the rotor are known from the state of the art. Such a planar drive system is described, for example, in publication DE 10 2017 131 304 A1. With the aid of such a planar drive system, in particular a linear and translative movement of the rotor is possible. This means that with the aid of such a planar drive system, the rotor may be moved freely in parallel to the stator surface above a stator surface under which the rectangular and elongated coil groups are arranged, and may be moved perpendicular with regard to the stator surface at least at different distances from the stator surface. Linear drive systems are also known from the prior art.

If such a drive system, in particular a planar drive system, is used in automation technology, particularly in production technology, handling technology, process technology, stage and show technology or building and catering technology, information relevant to the operation of the drive system may be shown to a human operator or supervisor with the aid of a screen or display. However, this means that the operator or supervisor must regularly look away from the drive system in order to view the screen or display. As a result, the operator or supervisor may not be able to perceive all relevant information in time and may react too late to information shown on a screen or display.

It is an object of the invention to provide an improved automation system. A further object of the invention is to provide a method for operating such an automation system. A further object of the invention is to provide a control system for carrying out the method. It should be possible to perceive information without having to look away from the drive system.

SUMMARY

According to a first aspect, a method operates an automation system, wherein the automation system comprises a drive system and an optical projection unit, wherein the drive system comprises a movable rotor, wherein the rotor may be driven with the aid of a drive, and wherein a control system of the automation system carries out the steps of determining a position information of a rotor; linking the position of the rotor to an object to be displayed; rendering a projection to be displayed by the optical projection unit based on the position information of the rotor and the object to be displayed, and outputting the rendered projection to the optical projection unit, so that the optical projection unit outputs the rendered projection on a surface and/or on the rotor or its superstructures and/or transport goods of the drive system.

According to a second aspect, a control system of a planar drive system comprises a planar stator and a rotor movable in at least two directions, wherein the rotor may be driven with the aid of a drive of the stator, is configured to determine a position information of the rotor, to ink the rotor to an object to be displayed, said object comprising a display information; to render a projection to be displayed by an optical projection unit based on the position information of the rotor and the object to be displayed, wherein the projection to be displayed generates an image, and to output the rendered projection to the optical projection unit, so that the optical projection unit outputs the rendered projection on a surface and/or on the rotor or its superstructures and/or transport goods of the drive system, wherein the position information comprises a distance of a rotor surface to a surface and wherein the distance is taken into account during rendering of the projection to be displayed.

According to a third aspect, an automation system comprises a planar drive system and an optical projection unit, wherein the planar drive system comprises a planar stator and a rotor movable in at least two directions, wherein the rotor may be driven with the aid of a drive of the stator comprising a rotor and an optical projection unit, wherein a control system of the automation system determines a position information of the rotor, links the rotor to an object to be displayed, the object comprising a display information; renders a projection to be displayed by the optical projection unit based on the position information of the rotor and the object to be displayed, the projection to be displayed generating an image, and outputs the rendered projection to the optical projection unit, so that the optical projection unit outputs the rendered projection on a surface and/or on the rotor or its superstructures and/or transport goods of the drive system, wherein the position information comprises a distance of a rotor surface to a surface and wherein the distance is taken into account during rendering of the projection to be displayed.

EXAMPLES

A method operates an automation system comprising a drive system and an optical projection unit. The drive system comprises a movable rotor which is drivable with the aid of a drive. A control system of the automation system carries out the steps described below.

A position information of a rotor is determined. Furthermore, an object to be displayed is linked to a position of the rotor. A projection to be displayed by the optical projection unit is then rendered using the position information of the rotor and the object to be displayed. Finally, the rendered projection is output to the optical projection unit so that the optical projection unit outputs the rendered projection on a surface and/or as a hologram in the direct vicinity of the drive system and/or the rotor of the drive system.

The first two steps, i.e. determining the position information of the rotor and linking the object to be displayed to the rotor, may be carried out one after the other in any order or simultaneously. In particular, rendering may involve assembling the projection to be displayed using the position information and the object to be displayed.

The object to be displayed may, for example, comprise display information, wherein the display information may comprise information relevant to a human operator or supervisor. Since the object to be displayed is output on a surface and/or as a hologram in the immediate vicinity of the drive system, the human operator or supervisor is enabled to perceive relevant information without having to look away from the drive system.

The drive system may either be a linear drive system or a planar drive system. If the drive system is a planar drive system, the surface on which the object to be displayed is output may at least partially comprise a stator surface of the planar drive system.

A control system for an automation system is set up to carry out the steps of the method. The control system is thus set up to determine position information of a rotor and to link an object to be displayed to the position of the rotor. Furthermore, the control system is set up to subsequently render a projection to be displayed by the optical projection unit using the position information of the rotor and the object to be displayed. The control system is also set up to output the rendered projection to the optical projection unit. The optical projection unit may then output the rendered projection on a surface and/or as a hologram in the direct vicinity of the drive system and/or the rotor of the drive system.

The control system may comprise at least one computing unit. If necessary, the control system may also comprise a first controller having a first computing unit and a second controller having a second computing unit. The first controller may then be used in particular to control the drive system and provide the position information of the rotor, while the second controller reads in the position information, links the object to be displayed to the rotor, renders the projection to be displayed using the position information of the rotor and the object to be displayed and outputs the rendered projection to the optical projection unit.

As the case may be, the second controller having a second computing unit may again comprise an additional further controller and an additional further computing unit. The additional further controller transmits information on the projection section on the rotor to the second controller and receives adapted information for this projection section from the second projection unit. The additional further computing unit renders the projection section and transmits the rendered projection to a further projection unit.

An automation system comprises a drive system and an optical projection unit. The drive system comprises a movable rotor. The rotor is drivable with the aid of a drive. The automation system further comprises a control system according to the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
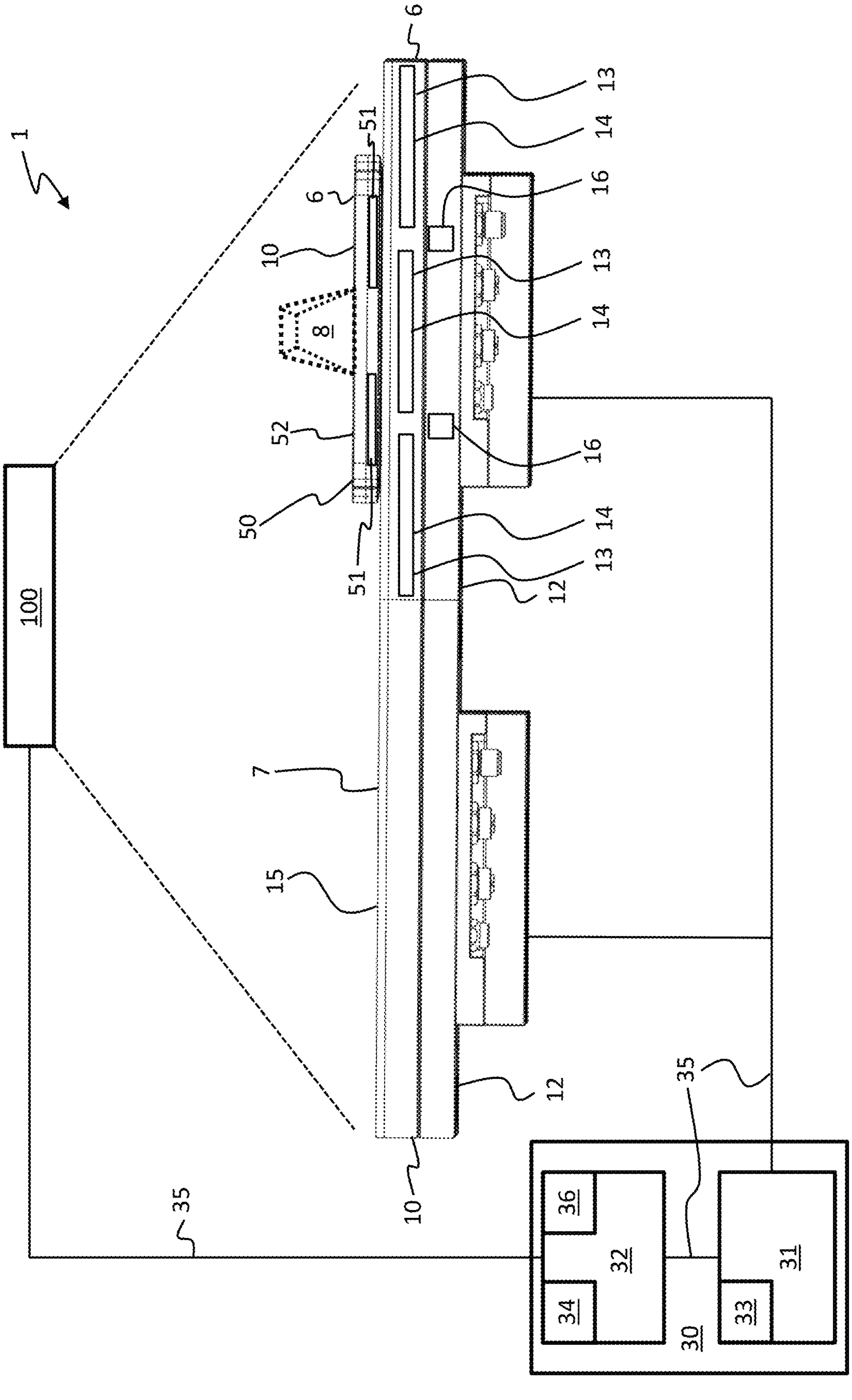
FIG. 1 shows a cross-section of an automation system.

In the following description of the figures, identical elements are indicated by identical reference numerals. It is possible that reference numerals are shown in individual figures that are not described in connection with this figure. In this case, the descriptions of these reference numerals, which are described in connection with other figures, may be used to describe the elements indicated by these reference numerals. Furthermore, features and properties may be designated as optional in the figure descriptions. These features and properties designated as optional are then not mandatory and, as the case may be, may also be omitted.

In embodiments of the method disclosed here, position information is determined using a position of a rotor in relation to an automation system and/or drive system. This may, for example, involve determining the position of the rotor in relation to a stator assembly of the drive system and, in particular, may be carried out using a position sensor. If the rotor comprises a magnetic unit, the position sensor may have a magnetic field sensor. This may allow for outputting the object to be displayed that is matched to the position of the rotor.

In an embodiment of the method, the position of the rotor is determined at least twice as often, in particular three times as often, as the projection to be displayed is rendered. This allows the output of the object to be displayed to be matched to the position of the rotor quickly enough and the projection to be displayed may move with the rotor without jerking or disruptive effects.

In an embodiment of the method, communication within the control system has real-time capability. In particular, this means that information may be exchanged within the control system so quickly that the object to be displayed may be tracked even when the rotor is moving quickly and the object to be displayed moves with the rotor without offset.

In an embodiment of the method, the projection to be displayed is first calculated in a virtual figure space using a virtual object and then rendered for a real space using a viewing window of the figure space. The output rendered projection of the viewing window enhances or enriches the detection and/or perception of the rotor or its superstructures and/or transported goods and/or the surface with information from the figure space. This allows for efficient calculation and rendering of the object to be displayed.

The real space may be linked to the multidimensional figure space via a linking rule. Objects arranged in real space, such as components of the drive system, may be assigned to figures in figure space using an assignment rule. A linking rule between real space and figure space may be used to determine how the virtual objects of the figure space are projected into real space in order to be able to output the rendered viewing window.

A movement of the objects arranged in real space, such as the rotor, may be transferred to the figure space. A virtual object assigned to the object in real space may then also be moved in the figure space. The projection to be displayed may then also be changed based on the position of the virtual object and thus also moved in the rendered projection to be displayed.

By linking real space and figure space, a high degree of abstraction may be achieved, which allows the method according to the invention to be adapted to a large number of applications.

The figure space may, for example, contain a 3D model (or sections thereof) of a machine, a building system, a stage or similar. Real objects may be connected to virtual images in the figure space with the aid of a controller. If an interaction takes place with the virtual space, the respective real objects and any virtual extensions of them react accordingly.

It may be provided that the position and size of the figure space and the figures assigned to the objects to be controlled are automatically determined according to the position and size of detected objects to be moved. This facilitates the creation of a figure space assigned to a real space.

In an embodiment, the position information is determined using a position of the rotor in relation to the figure space.

In an embodiment of the method, the figure space contains various elements. One of the elements is selected as the object to be displayed on the basis of information from the control system and/or the automation system and is taken into account when rendering the projection to be displayed. This may be advantageous if a plurality of elements may contain different information and thus different information may be displayed, as well.

In an embodiment of the method, a property is assigned to the object to be displayed in the figure space. The element is selected on the basis of the property.

In an embodiment of the method, the virtual object is moved in the figure space using the position information of the rotor. This allows for simple tracking of the object to be displayed when the rotor moves.

In an embodiment of the method, the projection to be displayed is rendered in such a way that the object to be displayed moves with the rotor and a relative position between the rotor and the object to be displayed is fixed. This also allows for simple tracking of the object to be displayed when the rotor moves.

In an embodiment of the method, the object to be displayed is projected onto the rotor. In an embodiment of the method, the object to be displayed is projected next to the rotor at a predetermined distance from the rotor. In both cases, a simple assignment of information passed on with the aid of the object to be displayed to a specific rotor may be easily recognized by a human operator or supervisor.

In an embodiment of the method, the determination of the position information, the rendering of the projection to be displayed and the output of the rendered projection are carried out again at least after each change in position of the rotor. This may also allow for simple tracking of the object to be displayed when the rotor moves.

In an embodiment of the method, the object to be displayed is linked to a real measured variable, in particular a real measured variable of the drive system. In particular, the real measured variable may be a temperature, an energy consumption, a force or a weight of at least one rotor or at least one motor element of the drive.

In an embodiment of the method, display information is read in via an interface and the object to be displayed is set using the display information. For example, real measured variables or other information to be displayed may be read in via the interface, which would otherwise not be available to the control system. This allows the information to be displayed to be made even more flexible and, for example, additional information relevant to the human operator or supervisor may be read in.

In an embodiment of the method, the position information includes a distance of a rotor surface from the surface. The distance is taken into account when rendering the projection to be displayed. If the drive system is a planar drive system, the distance may be determined in particular on the basis of a flight altitude of the rotor. This makes it possible to adjust the projection to be displayed to the distance, for example by focusing on the rotor surface.

In an embodiment of the method, the automation system comprises a further optical projection unit. Prior to rendering the projection to be displayed, the position information is used to determine whether the rendered projection is to be projected by the optical projection unit and/or by the further optical projection unit. This information is taken into account during rendering. This also allows for more complex displays using a plurality of optical projection units.

In an embodiment of the method, the rendered projection is projected both by the optical projection unit and by the further optical projection unit in a transition area.

In an embodiment of the automation system, the drive system is a planar drive system. The planar drive system comprises at least one stator assembly comprising a plurality of coil groups for generating a stator magnetic field, a stator surface above the stator assembly and a rotor. The surface corresponds to the stator surface. The rotor further comprises a plurality of magnet units for generating a rotor magnetic field. The coil groups and the magnet units form the drive. The rotor may be moved above the stator surface in parallel to the stator surface with the aid of an interaction between the stator magnetic field and the rotor magnetic field.

In an embodiment of the automation system, a data connection between the drive system, the control system and the optical projection unit is provided with the aid of a real-time capable communication bus.

FIG. 1 shows a cross-section of an automation system 1 comprising a drive system 5 and an optical projection unit 100, wherein the drive system 5 comprises a movable rotor 50. The rotor 50 may be driven with the aid of a drive 6. The automation system 1 further comprises a control system 30. The control system 30 is set up to carry out the steps described below. The control system 30 is set up to determine position information of the rotor 50 and to link an object to be displayed to the rotor 50. Furthermore, the control system 30 is set up to render a projection to be displayed by the optical projection unit 100 using the position information of the rotor 50 and the object to be displayed. Furthermore, the control system 30 is set up to output the rendered projection to the optical projection unit 100, so that the optical projection unit 100 outputs the rendered projection on a surface 7 and/or as a hologram 8 in the immediate vicinity of the rotor on the rotor 50 of the drive system 5.

In particular, the object to be displayed may include the information to be displayed, including the type of display, wherein no position is yet defined at which the object to be displayed is to be shown. In addition to the object to be displayed, the projection to be displayed may also include the position in the automation system at which the object to be displayed is to be shown.

The optical projection unit 100 may, for example, comprise a projector with the aid of which a two-dimensional multicolored image having a predetermined resolution may be output. As an alternative or in addition, the optical projection unit 100 may comprise a laser light source, which may be used to output a two-dimensional monochrome or multicolored image. As an alternative or in addition, the optical projection unit 100 may also generate a three-dimensional multicolored image, also referred to as a hologram 8, with the aid of holographic projection.

Optionally, but also shown in FIG. 1, the drive system 5 is a planar drive system 10. The planar drive system 10 comprises at least a stator assembly 13, each with a plurality of coil groups 14 for generating a stator magnetic field, a stator surface 15 above the stator assembly 13 and the rotor 50. The surface 7 corresponds to the stator surface 15. The rotor 50 comprises a plurality of magnet units 51 for generating a rotor magnetic field. The coil groups 14 and the magnet units 51 form the drive 6. The rotor 50 may be moved above the stator surface 15 in parallel to the stator surface 15 with the aid of an interaction of the stator magnetic field with the rotor magnetic field.

The stator assembly 13, in each case having a plurality of coil groups 14 for generating a stator magnetic field, is only shown for one stator module 12, wherein the planar drive system 10 comprises a plurality of stator modules 12. Each stator module 12 may have an identical structure. Furthermore, it may be provided that a plurality of stator assemblies 13 having coil groups 14 is arranged within a stator module 12. As the case may be, further magnet units 51 and further coil groups 14 may also be arranged so that the rotor 50 in FIG. 1 may be moved both to the right and to the left and also into or out of the drawing plane.

It may be provided that the drive system 5 comprises a different drive system, such as a linear transport system, instead of the planar drive system 10 shown in FIG. 1. All the properties and features described below for the planar drive system 10 may also be used in a linear transport system or in a differently embodied drive system 5.

The stator modules 12 may optionally comprise magnetic field sensors 16, wherein a position of the magnetic units 51 and thus of the rotor 50 may be detected with the aid of the magnetic field sensors 16. Alternative position sensors may also be provided, which allow for a position of the rotor 50 to be detected based on a different measuring principle. The magnetic field sensors 16 may have Hall sensors, in particular 3D Hall sensors.

The control system 30 optionally comprises a first controller 31 having a first computing unit 33 and a second controller 32 having a second computing unit 34. The first controller 31 may then be used in particular to control the drive system 5 and provide the position information of the rotor, for example with the aid of the magnetic field sensors 16. The second controller 32 may read in the position information, link the object to be displayed to the rotor 50, render the projection to be displayed using the position information of the rotor 50 and the object to be displayed, and output the rendered projection to the optical projection unit 100.

For this purpose, the first controller 31, the second controller 32, the stator modules 12 and the optical projection unit 100 are connected to one another via a communication bus 35. The communication bus 35 may optionally be real-time capable, so that there are no interruptions in the method steps. In addition, the communication bus 35 may comprise a known bus such as EtherCAT. FIG. 1 also shows that the communication bus 35 is connected to all stator modules 12. Alternatively, it is also conceivable to connect the communication bus 35 to only one stator module 12 if the stator modules 12 also have a communication connection to each other. Alternatively, the control system 30 may also comprise only one computing unit, wherein the computing unit may then take over the objects of both the first computing unit 33 and the second computing unit 34.

As an alternative to the embodiment of FIG. 1, a stator module 12 may comprise four stator assemblies 13 in each case, wherein the four stator assemblies 13 are arranged within a stator module 12 in a square two-by-two arrangement. Furthermore, the stator assemblies 13 may comprise coil groups 14, wherein the coil groups 14 may be arranged with different orientations. The coil groups 14 are used to generate a stator magnetic field. The coil groups 14 may be embodied as rectangular and elongated coil groups 14. Three individual, rectangular and elongated coils of a coil group 14 may be arranged in each stator assembly 13 of the stator modules 12. Similarly, in a further embodiment, a different number of individual rectangular and elongated coils could form a coil group 14.

Furthermore, a plurality of coil groups 14 may be arranged one above the other, each of which has an orientation rotated by 90° in relation to its longitudinal extension. This grid of elongated and rectangular coils of a coil group 14 may be embodied one on top of the other several times. The coil groups 14 may interact with the magnet units 51 when energized accordingly, thereby moving the rotor 50 within the planar drive system 10 above the stator surface 15. A plane of movement for the rotor 50 is therefore defined by the stator surface 15. The coil groups 14 may be arranged in parallel to the outer edges of the stator modules 12. If the stator modules 12 each comprise outer edges at a 90° angle with regard to one another, two different orientations of the coil groups 14 are therefore possible and necessary for the movement of the rotor 50.

The magnet units 51 may be arranged in parallel to the outer edges of the rotor 50. Furthermore, the magnet units 51 may be arranged inside of the rotor 50 on the outer edges of the rotor and may interact with the coil groups 14 in order to move the rotor in parallel to the outer edges of the stator modules 12. It is also possible to superimpose two movements in parallel to the outer edges so that the rotor 50 may be moved in all directions parallel to the stator surface 15. The arrangement of four stator assemblies 13 within a stator module 12 corresponds to the stator modules 12 marketed by Beckhoff Automation GmbH & Co KG under the name XPlanar for a planar drive system 10. Alternatively, it may also be provided to arrange more or fewer stator assemblies 3 within a stator module 2. For example, each stator module 2 may comprise only one stator assembly 3 or comprise more than four stator assemblies 3 and is described, for example, in publication DE 10 2017 131 304 A1.

The further figures may contain the reference numerals described in connection with FIG. 1. In the description, these reference numerals may not be referred to any further, as the parts of the planar drive system 1 described with these reference numerals have been described in connection with FIG. 1.

Figure 2:
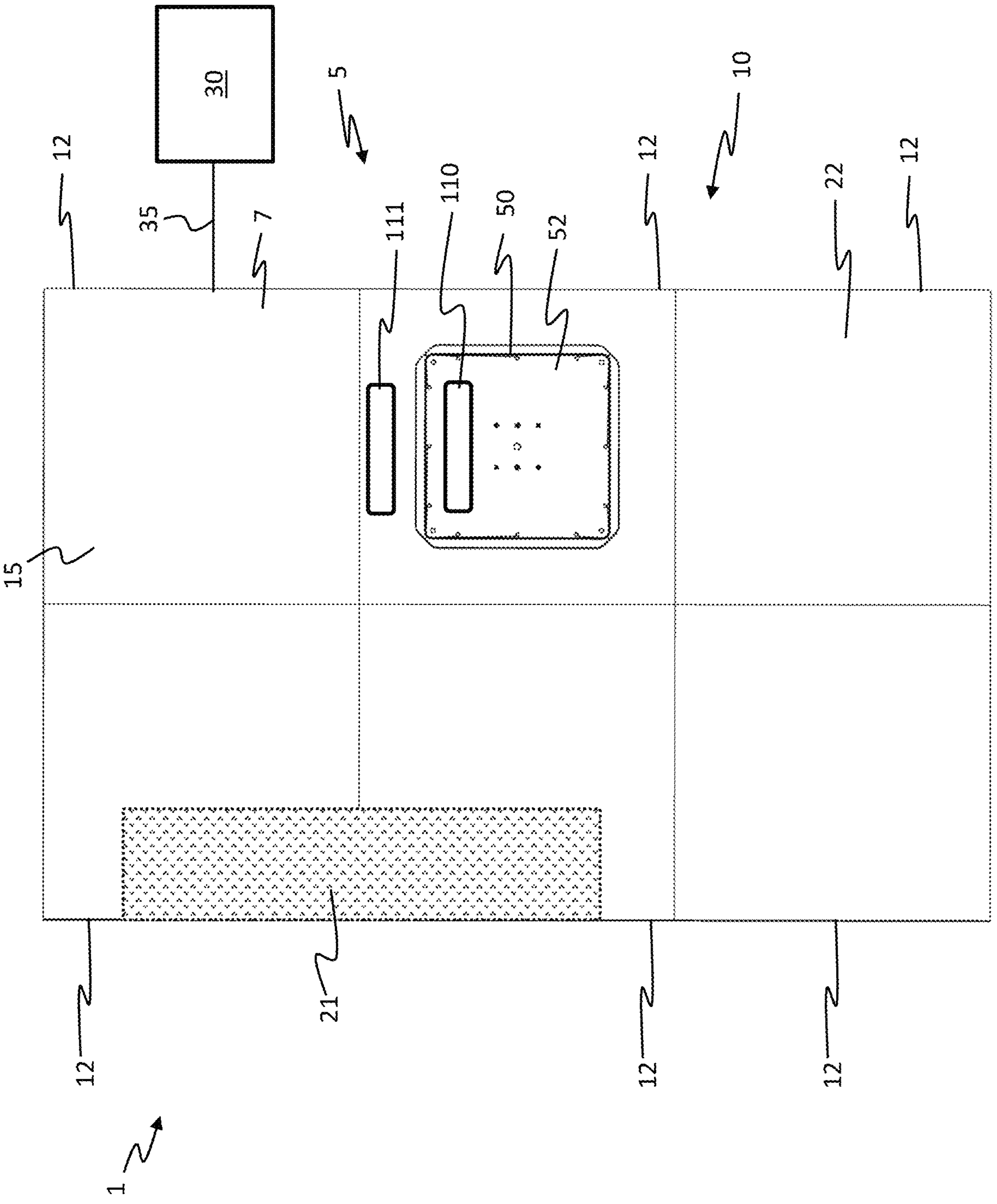
FIG. 2 shows a top view of the automation system of FIG. 1.

FIG. 2 shows a top view of the automation system 1 of FIG. 1, wherein the optical projection unit 100 is shown in FIG. 1. A rendered projection 110 in the form of a rectangle is shown on a rotor surface 52 or its superstructures and/or transported goods, wherein the rectangle is intended to represent a placeholder for the information to be output. Furthermore, an alternative rendered projection 111 is shown on the stator surface 15. It may be provided that both the rendered projection 110 and the alternative rendered projection 111 are output. The stator surface 15 further comprises six stator modules 12, although a different number of stator modules 12 may also be provided.

The rendered projection 110 and also the alternative rendered projection 111 may be rendered in such a way that the object to be displayed is linked to a real measured variable, in particular a real measured variable of the drive system 5. For example, the rendered projection 110 and/or the alternative rendered projection 111 may indicate a load of the rotor 50, for example by the rendered projection 110 and/or the alternative rendered projection 111 including a numerical value of a mass of the rotor or by the rendered projection 110 and/or the alternative rendered projection 111 including a color coding for the load of the rotor 50 (for example: green for unloaded, red for fully loaded and yellow for loaded, but not up to the capacity limit). Information rendered with the aid of the rendered projection 110 or the alternative rendered projection 111 may therefore be easily perceived by a human operator or supervisor of the automation system 1 without having to look away from the automation system 1.

A further optional display option is shown in FIG. 2. The stator surface 15 is divided up into a first region 21 and a second region 22, wherein the first region 21 may, for example, be illuminated in a different color than the second region 22. This may, for example, reflect a temperature of the stator modules 12 or parts of the stator modules 12. For example, the temperature in the first region 21 could be increased and the first region could therefore be illuminated in red. The second region could not have an increased temperature and therefore be illuminated in green or not illuminated at all. In this case, it may be intended that the rotors 50 are primarily moved in the second region 22, which may be easily checked by a human operator or supervisor without having to look away from the automation system 1.

The objects to be displayed may, in particular, be physical measured variables such as temperatures of the stator modules 12 or the coil groups 14, energy consumption during a drive of the rotor 50, forces acting on a rotor 50 or a weight of a load of a rotor 50. Furthermore, the objects to be displayed may also include values calculated from the physical measured variable.

In addition to or instead of the first region 21 or the second region 22, the optical projection unit 100 may be used to project an overview map or boundary lines onto the stator surface 15. A human operator or supervisor may then easily check whether these boundary lines or boundaries specified by the overview map are being observed. Furthermore, the human operator or supervisor may also operate an input device and use it in order to control movements of a rotor 50 while observing the boundary lines or boundaries specified by the overview map, as they may perceive these visually.

An automation system 1 configured as shown in FIGS. 1 and 2 may therefore be operated as follows: First, position information of a rotor 50 is determined and an object to be displayed is linked to the position of the rotor 50. These steps may be carried out simultaneously or one after the other in any order. Subsequently, a projection to be displayed by the optical projection unit 100 is rendered using the position information of the rotor 50 and the object to be displayed and the rendered projection 110 or the alternative rendered projection 111 is output to the optical projection unit 100, so that the optical projection unit 100 outputs the rendered projection 110, 111 on a surface 7 and/or on the rotor 50 or its superstructures and/or transport goods of the drive system 5.

The position information may optionally be determined using a position of the rotor 50, for example with the aid of the magnetic field sensors 16. The position of the rotor 50 may be determined relative to the automation system 1 or relative to the drive system 5, for example the planar drive system 10, and in particular also relative to a component of the drive system 5, such as a stator assembly 13.

In an embodiment example, the position of the rotor 50 is determined at least twice as often, in particular three times as often, as the rendered projection 110, 111 is rendered. This allows for a real-time capable implementation, since the position information is determined with a better temporal resolution compared to a frame repetition rate of the optical projection unit 100. In particular, this makes it possible to achieve that all movements of the rotor 50 are converted into a suitable rendered projection 110 or alternative rendered projection 111, in which the object to be displayed moves directly with the rotor 50.

In an embodiment example, the rendered projection 110 or the alternative rendered projection 111 is rendered in such a way that the object to be displayed moves with the rotor 50 and a relative position between the rotor 50 and the object to be displayed is fixed. This means that the rotor 50 may move over the stator surface 15 in the representation of FIG. 2 and the rendered projection 110 or the alternative rendered projection 111 moves with the rotor 50 in such a way that the rendered projection 110 or the alternative rendered projection 111 are always arranged in an identical position relative to the rotor 50.

Figure 3:
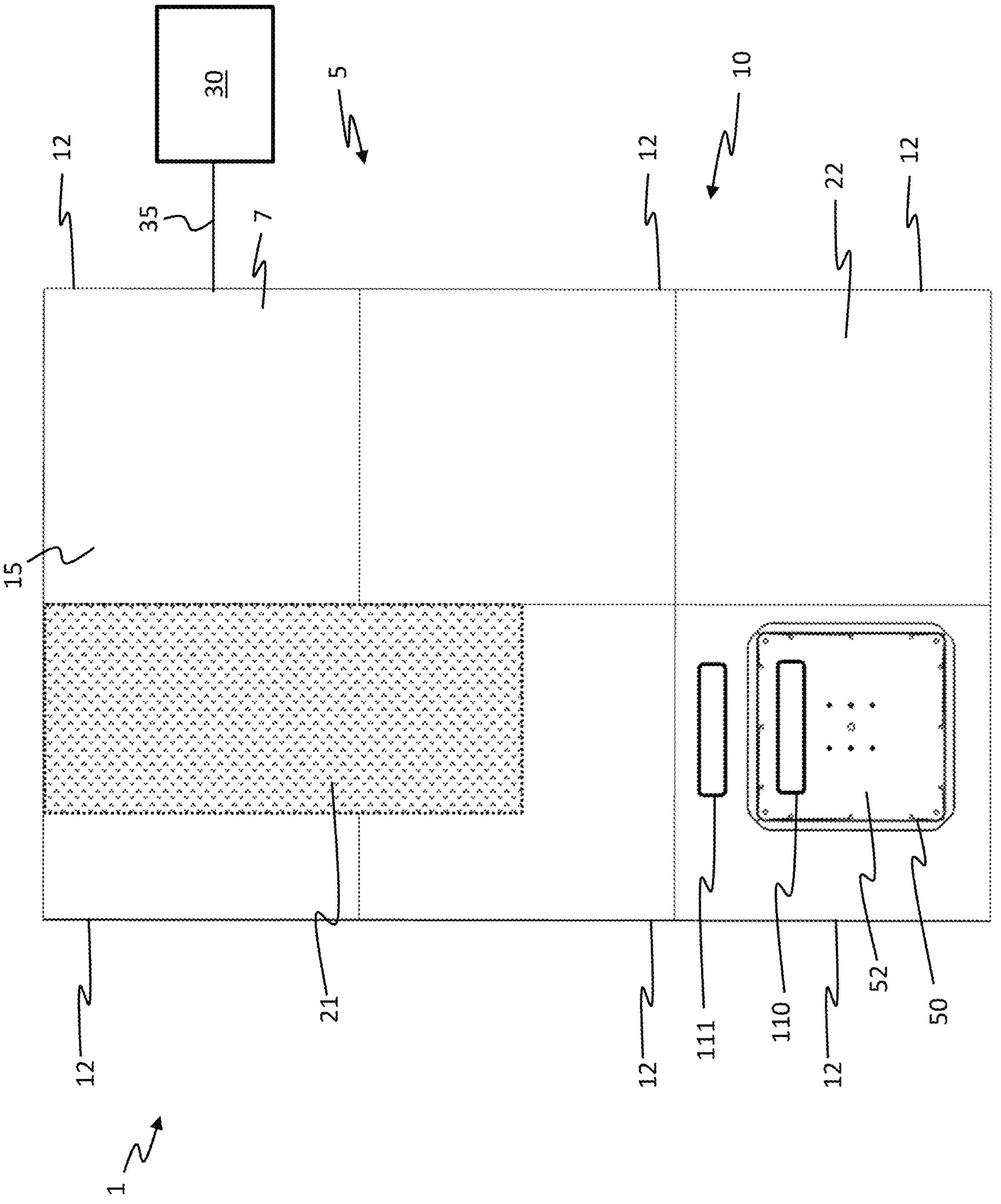
FIG. 3 shows an additional top view of the automation system of FIGS. 1 and 2 after a movement of a rotor.

FIG. 3 shows a further top view of the automation system 1 of FIGS. 1 and 2, in which the rotor 50 has been moved and the rendered projection 110 or the alternative rendered projection 111 has been moved along with the rotor 50, so that the relative position has remained identical.

In the representations of FIGS. 2 and 3, the object to be displayed and thus the rendered projection 110 is projected onto the rotor 50 or its superstructures and/or transported goods, or the object to be displayed and thus the alternative rendered projection 111 is projected next to the rotor 50 at a predetermined distance from the rotor 50. As already described, only either the rendered projection 110 or the alternative rendered projection 111 may be projected.

In an embodiment of the method, the determination of the position information, the rendering of the projection to be displayed and the output of the rendered projection 110 or the alternative rendered projection 111 are carried out again at least after each change in position of the rotor 50.

Furthermore, the first region 21 and the second region 22 are arranged differently in FIG. 3 than in FIG. 2. This may be caused, for example, by a change in the temperature distribution of the stator modules 12, since other regions of the stator surface 15 may now have an increased temperature.

In an embodiment example, display information is read in via an interface 36, as shown in FIG. 1, for example, and the object to be displayed is set using the display information.

In an embodiment example, the position information includes a distance of a rotor surface 52 from the surface 7. The distance is taken into account when rendering the projection to be displayed. This makes it possible, for example, to take into account a flight altitude of the rotor 50 in the planar drive system 10. The higher the rotor 50 flies, the smaller the rendered projection 110 may be in order to be displayed on the rotor 50 or the rotor surface 52 or its superstructures and/or transport goods of identical size.

Figure 4:
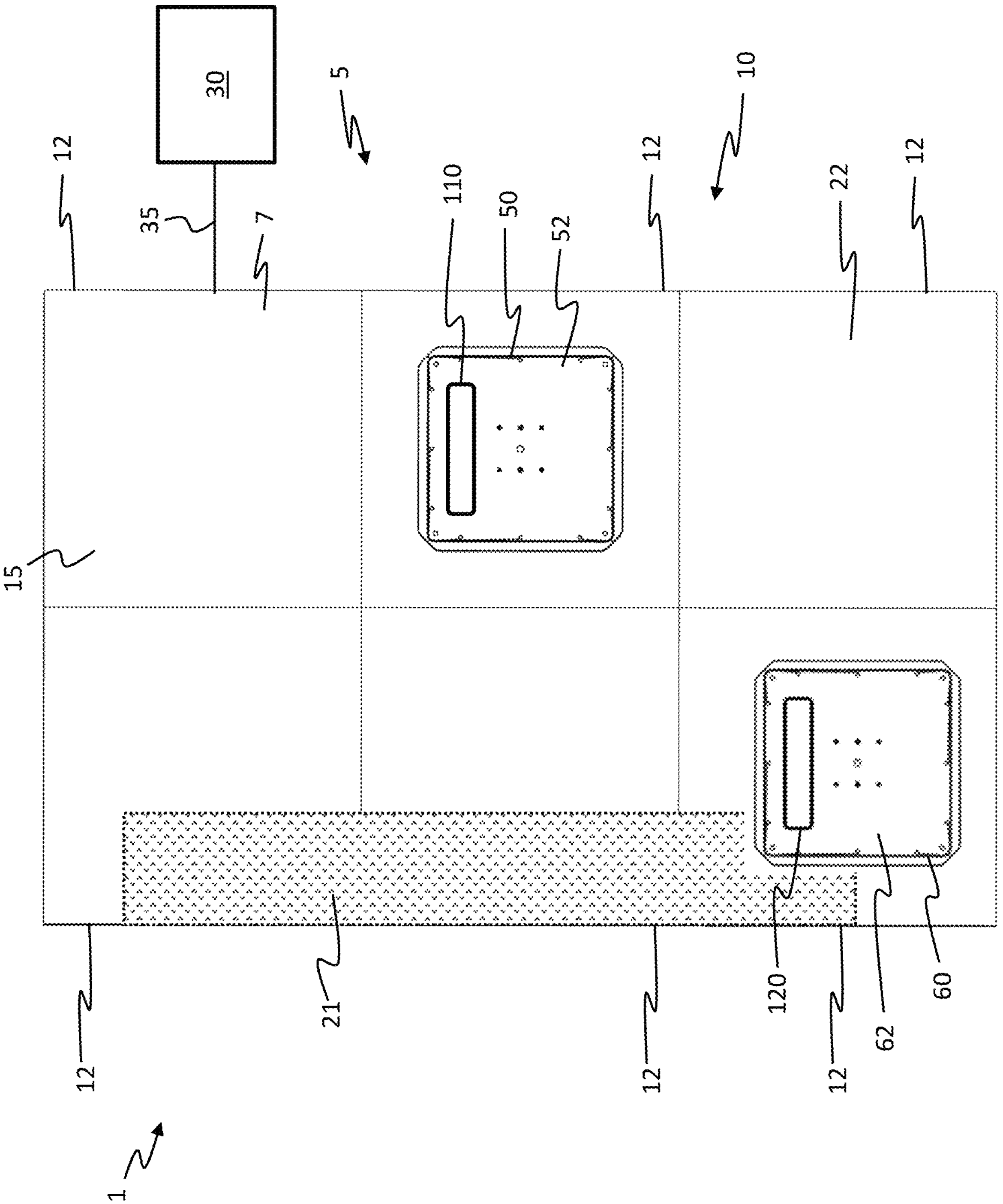
FIG. 4 shows an additional top view of the automation system of FIGS. 1 to 3.

FIG. 4 shows a top view of the automation system 1 of FIGS. 1 to 3 and corresponds to the representation of FIG. 2, unless differences are described below. In this example, too, the first region 21 and the second region 22 are again arranged differently compared to the depictions of FIGS. 2 and 3. Only a rendered projection 110 is shown for the rotor 50, which is displayed on the rotor surface 52 or its superstructures and/or transported goods. Furthermore, a further rotor 60 is arranged above the stator surface 15, which may correspond to rotor 50 in its structure. The further rotor 60 thus comprises a further rotor surface 62 with superstructures and/or transport goods, and furthermore further magnet units with the aid of which it may be driven via the coil groups 14. However, the further magnet units are not visible in the representation of FIG. 4. A further rendered projection 120 is arranged on the further rotor surface 62 or its superstructures and/or transport goods. All the features and method steps described in connection with the rendered projection 110 for the rotor 50 may be repeated for the further rotor 60 and thus the further rendered projection 120 may be created and displayed.

In the illustration in FIG. 4, the further rotor 60 is partially arranged in the first region 21 of the stator surface 15. A human operator or supervisor may immediately recognize that this is the case if the first region 21 is colored red, for example due to its temperature. In this case, the human operator or supervisor may decide whether intervention on their part is necessary or whether movement of the other rotor 60 in the first region may (still) be tolerated. This may be carried out without having to look away from the automation system 1.

Figure 5:
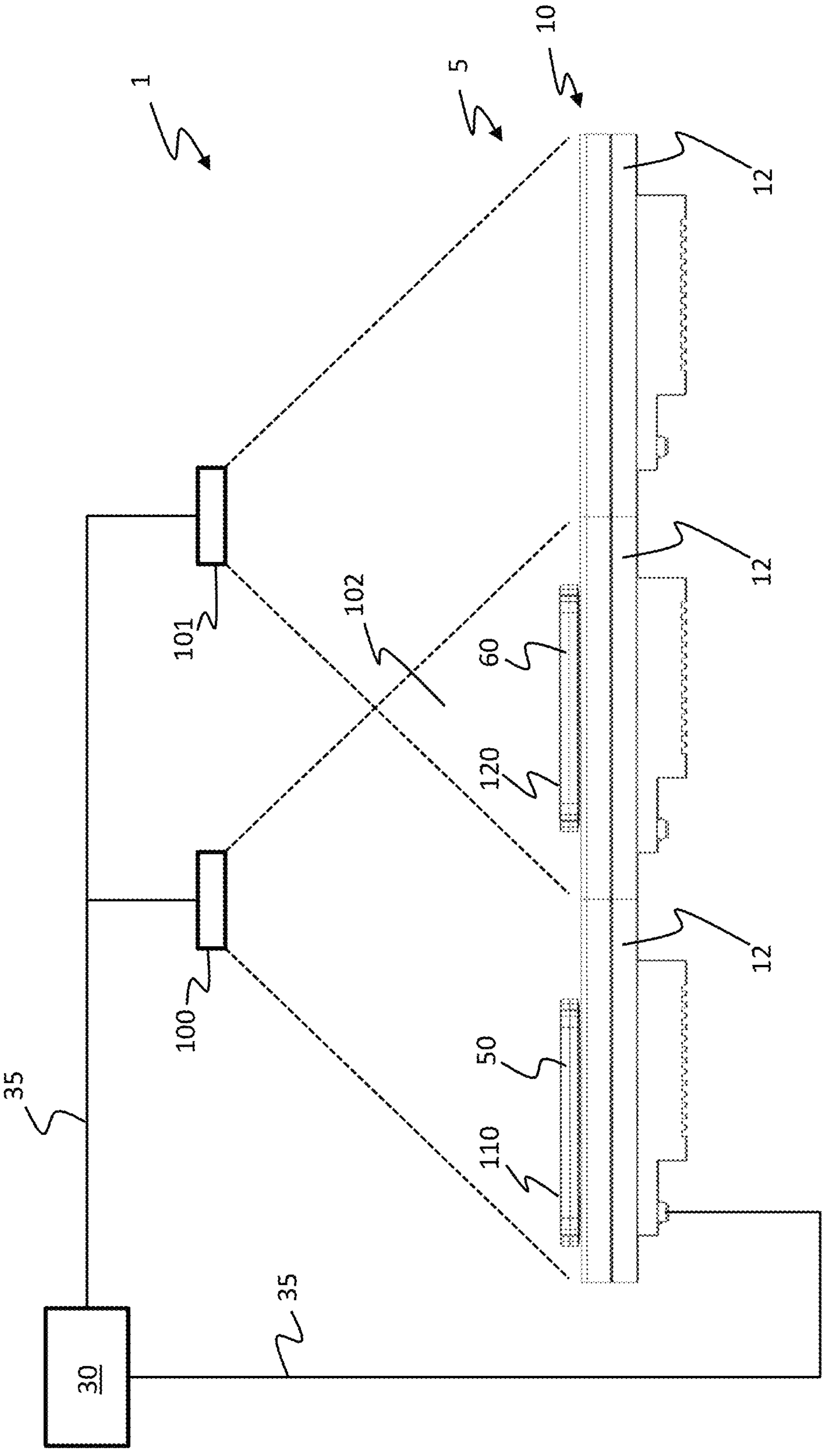
FIG. 5 shows a side view of a further automation system.

FIG. 5 shows a side view of a further automation system 1 which corresponds to the automation system 1 of FIGS. 1 to 4, unless differences are described below. The drive system 5 is again a planar drive system 10 and comprises three stator modules 12 arranged next to one another. It may be left open how many stator modules 12 are arranged one behind the other in the plane of the drawing. Furthermore, a rotor 50 is shown with a rendered projection 110 and a further rotor 60 with a further rendered projection 120. The control system 30 is shown in simplified form and may be embodied as described in connection with FIG. 1.

The automation system 1 comprises a further optical projection unit 101, which is also connected to the control system 30 with the aid of the or a further communication bus 35. Before rendering the projection to be displayed, the position information is used to determine whether the rendered projection 110, 120 is to be projected by the optical projection unit 100 and/or by the further optical projection unit 101. In the case of the illustration of FIG. 5, this results in the rendered projection 110 having to be displayed by the optical projection unit 100, since the rotor 50 is outside of the display area (indicated by a dashed line) of the further optical projection unit 101, and the further rendered projection 120 may be displayed by the optical projection unit 100 and the further optical projection unit 101, so that the optical projection unit 100 and/or the further optical projection unit 101 may be selected to display the further rendered projection 120. This is taken into account when rendering the projection to be displayed. The further optical projection unit 101 may be embodied in the same way as the optical projection unit 100.

In an embodiment example, in an automation system 1 as shown in FIG. 5, the further rendered projection 120 is projected into a transition area 102 both by the optical projection unit 100 and by the further optical projection unit 101. If the rotor 50 is located in the transition area 102 instead of the further rotor 60, the rendered projection 110 may also be projected by both the optical projection unit 100 and the further optical projection unit 101. This allows for transitions of the rotor 50 or of the further rotor 60 between the display areas of the optical projection units 100, 101 without the projection having to be interrupted.

If a plurality of optical projection units 100, 101 are provided, it may be provided that a second controller 32 takes over the calculations for all optical projection units 100, 101 or that a separate second controller 32 is used for each optical projection unit 100, 101. Furthermore, it may be provided that the optical projection unit 100 or the further optical projection unit 101 has a different number of stator modules 12 in the respective display area.

Figure 6:
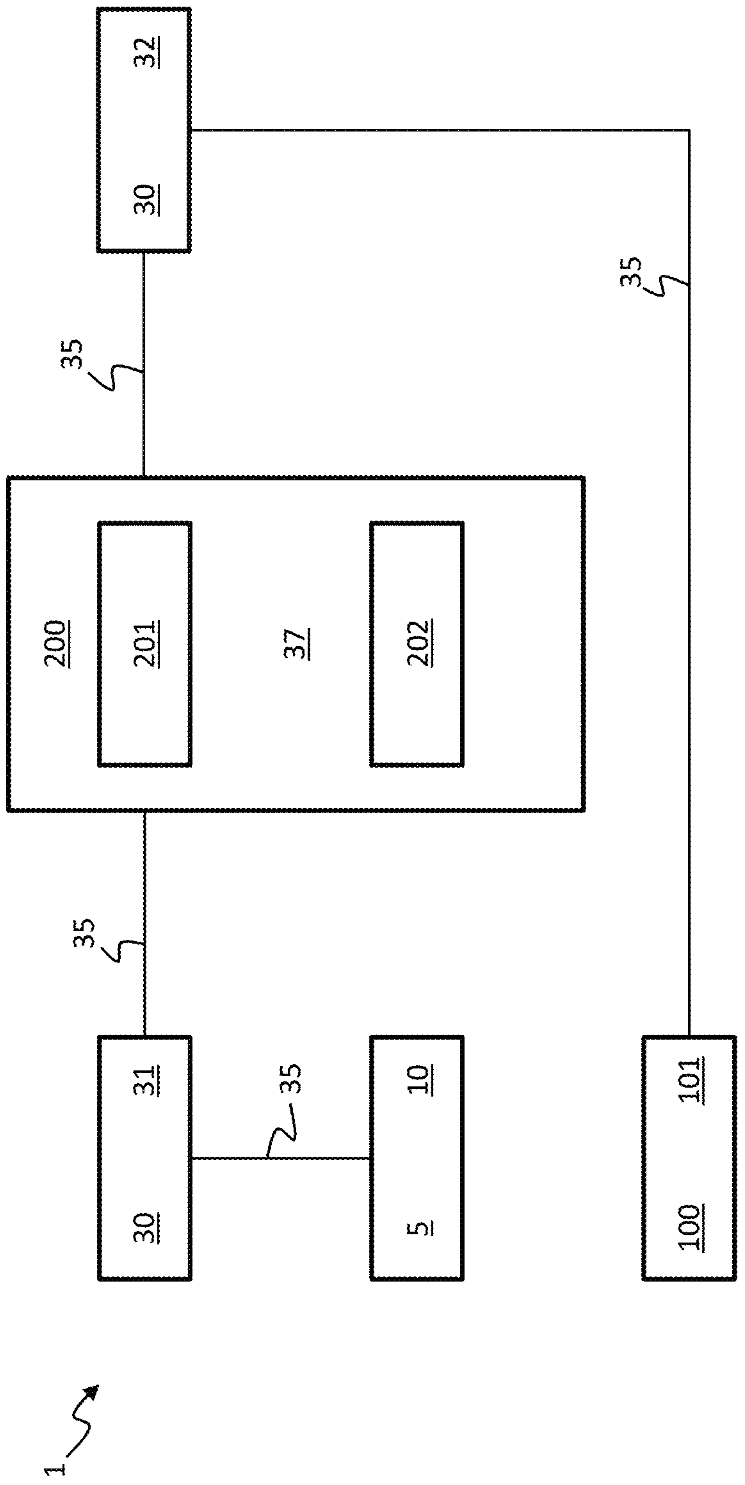
FIG. 6 shows the creation of the rendered projection.

FIG. 6 shows a schematic depiction of an automation system 1, in which a drive system 5 may be a planar drive system 10 with a rotor 50 or a further rotor 60, in which the control system 30 comprises a first controller 31 and a second controller 32 and in which an optical projection unit 100 and possibly a further optical projection unit 101 are provided. The automation system 1 also comprises a virtual figure space 200, which may be realized with the aid of a third controller 37. Alternatively, the virtual figure space 200 may also be assigned to the first controller 31 or the second controller 32.

The projection to be displayed is first calculated in the virtual figure space 200 using a virtual object 201 and then rendered for a real space. The virtual object 201 may comprise the rotor 50 or the further rotor 60 and, in addition to the physical configuration of the rotor 50 or the further rotor 60, may also comprise the information to be displayed in connection with the rotor 50 or the further rotor 60. The real space may, for example, be embodied as a virtual viewing window 202 onto the figure space 200. The output rendered projection 110, 111 of the viewing window 202 enriches the detection and/or perception of the rotor 50 or the further rotor 60 and/or the surface 7. The virtual viewing window 202 may be passed on to the second controller 32 in order to generate the rendered projection 110 or alternative rendered projection 111 or further rendered projection 120 using the virtual viewing window 202. It may be provided that the position of the rotor 50 or the further rotor 60 relative to the figure space 200 is determined.

The figure space serves to merge the depiction of the real drive system 5 with the other information that is also to be displayed and may therefore comprise an adapted or augmented reality (AR) of the automation system 1.

In an embodiment example, the figure space 200 comprises various elements. One of these is selected as the object to be displayed with the aid of information from the control system 30 and/or the automation system 1 and the selected element is taken into account when rendering the projection to be displayed. In this way, a plurality of elements to be displayed may be taken into account in the figure space 200, wherein only one is ultimately selected for display. This allows for an efficient calculation process if the selected element is to be changed, as sufficient information is already available for all elements.

In an embodiment, a property is assigned to the object to be displayed in the figure space 200. The element is selected based on this link. This further simplifies the calculation. The property may relate to a display type. For example, the property “loading” may be assigned to the object to be displayed, wherein the loading should then be output as a numerical value. In another example, the property “temperature” is assigned to the object to be displayed, which may be displayed in different colors using the illuminations already described.

In an embodiment example, the virtual object 201 is moved in the figure space 200 using the position information of the rotor 50 or of the further rotor 60. This also allows for further simplification of the calculation.

If a plurality of optical projection units 100, 101 are provided, it may be provided that a second controller 32 takes over the calculations for all optical projection units 100, 101 or that a separate second controller 32 connected to the figure space 200 is used for each optical projection unit 100, 101.

The first controller 31 may send at least one datum to the drive system 5 to specify the speed and/or location. After the rotor 50 has been moved on the basis of this speed and/or location specification, the drive system may send current speed and/or location data of the rotor 50 to the first controller 31. The speed and/or location data of the rotor 50 may, for example, be determined with the aid of the magnetic field sensors 16 or with other position sensors or calculated from the data of such position sensors or magnetic field sensors. Communication between the drive system 5 and the first controller 31 may take place with the aid of the communication bus 35, which may be realized, for example, in the form of a real-time-capable field bus, such as EtherCAT.

A bus driver, for example a field bus driver, of the automation system 1 that is linked to the communication bus 35 may forward the data received from the drive system 5 directly to a software module of the figure space 200 as properties of the virtual object 201 with the aid of a computing unit that calculates and manages the figure space. This software module may, for example, be operated on the third controller 37, or alternatively on the second controller 32. If the speed and/or location data have changed compared to the last reception, the virtual object 201 moves in the figure space 200 directly on the basis of the speed and/or location data.

The optical projection unit 100 projects information from the figure space 200 at a predetermined repetition frequency, which in particular does not interfere with the natural perception of the drive system 5 or of the rotors 50 and 60. A communication speed and a data rate of the or a further communication bus 35 between the second controller 32 and the optical projection unit 100 may correspond at least to the predetermined repetition frequency. If the optical projection unit 100 and the further optical projection unit 101 comprise different repetition rates, it may be useful to provide a separate second controller 32 for the optical projection unit 100 and for the further optical projection unit 101. The rendered projection 110 or the alternative rendered projection 111 or the further rendered projection 120 is output taking into account the repetition rate of the associated optical projection unit 100 or further optical projection unit 101.

The second controller 32 may receive data from the figure space 200 at least at the repetition rate of the optical projection unit 100 or of the further optical projection unit 101, render an image data stream from it and transfer it directly to the optical projection unit 100 or the further optical projection unit 101, wherein predetermined communication protocols may be used for this purpose.

An application may be used in an industrial environment (e.g. as a machine, process line, processing system), in a building and/or on a stage and be connected to an automation system 1.

The examples described below may both be applied using the figure space 200, as described in connection with FIG. 6, and for the embodiments of FIGS. 1 to 5.

It may further be provided that the object to be displayed comprises at least one photo file, wherein the rendered projection 110 or the alternative rendered projection 111 or the further rendered projection 120 may then comprise an image of the photo file. Alternatively, the object to be displayed may comprise a video file, wherein the rendered projection 110 or the alternative rendered projection 111 or the further rendered projection 120 may then comprise a sequence of the video of the video file. Furthermore, the object to be displayed may comprise a graphics file, which may then also be displayed in the rendered projection 110 or the alternative rendered projection 111 or the further rendered projection 120. The object to be displayed may also include a file or database containing tabular data. The rendered projection 110 or the alternative rendered projection 111 or the further rendered projection 120 may then contain a table or a diagram, wherein the diagram may be created from the tabular data.

The object to be displayed may contain Boolean information, for example determined from data of the automation system 1. The rendered projection 110 or the alternative rendered projection 111 or the further rendered projection 120 may then contain a light surface with the aid of which the Boolean information is displayed. Furthermore, the object to be displayed may contain numerical or textual information from the automation system 1, which may be reproduced in the rendered projection 110 or in the alternative rendered projection 111 or in the further rendered projection 120, respectively, in the form of a code or barcode or QR code.

It may be provided to specifically change the object to be displayed on the basis of an error message from the automation system 1. In particular, this may include the content of the projection to be displayed and its properties, such as size, position, orientation, color and/or focus. As an alternative or in addition, the object to be displayed may be specifically changed on the basis of a datum of the production data from the automation system 1 or at least from a company resource planning system (enterprise resource planning system, ERP system). This may also include the content of the projection and its properties, such as size, position, orientation, color and/or focus.

With the aid of at least one piece of production information from the automation system 1 or at least from an ERP system, the projection to be displayed may include this data. The information may also be provided in a machine-readable form for external systems with the aid of coding. Furthermore, it may be provided that the rendered projection 110 or alternative rendered projection 111 or further rendered projection 120 is adapted on the basis of this data with respect to color and/or size and/or transparency and/or font form and/or graphic content.

With the aid of at least one piece of position information from at least one rotor 50 or from a further rotor 60, the projection to be displayed may contain the upcoming and/or past path usage on at least one stator module 12 or parts of the stator surface 15. This may, for example, be displayed in color-coded form analogous to the first regions 21 and second regions 22 described in FIG. 2. Furthermore, the rendered projection 110 or the alternative rendered projection 111 or the further rendered projection 120 may represent initialization positions and/or setup positions on at least one stator module 12 with the aid of at least one position information of at least one rotor 50 or a further rotor 60.

Using at least one piece of Boolean and/or numerical information from the automation system 1, the projection to be displayed may contain route limits and/or route guidance. A human operator or supervisor of the automation system 1 may easily check visually whether these are being observed without having to look away from the automation system 1.

With the aid of at least one piece of position information from at least one rotor 50 or a further rotor 60, the projection to be displayed may include at least one optimized route on at least one stator module 12.

The object to be displayed may include a remaining time for a rotor 50 or for a further rotor 60 of an automation system 1 calculated from speed information and from a distance. In particular, the remaining time may indicate how long it will take until a predefined stator module 12 is traveled on. The projection to be displayed may contain this remaining time in color and/or text and/or graphically coded.

With the aid of at least one Boolean and/or numerical information from at least one automation system 1, the rendered projection 110 or the alternative rendered projection 111 or the further rendered projection 120 may contain safety-relevant regions such as the first region 21 or the second region 22.

With the aid of at least one Boolean and/or numerical information from at least one automation system 1, the rendered projection 110 or the alternative rendered projection 111 or the further rendered projection 120 may contain the current status and/or operating state of at least one automation system 1 and/or an element of the automation system 1 such as, for example, a stator module 12 and/or a rotor 50 or a further rotor 60.

With the aid of at least one piece of numerical information from at least one automation system 1, the rendered projection 110 or the alternative rendered projection 111 or the further rendered projection 120 may include at least one coordinate.

With the aid of at least one piece of Boolean information from at least one automation system 1, the rendered projection 110 or the alternative rendered projection 111 or the further rendered projection 120 may include a graphical grouping by, for example, an outline of at least two rotors 50, 60 and/or two stator modules 12.

With the aid of at least one thermal information from at least one drive element of the drive system 5, for example the stator module 12 and/or at least one rotor 50, 60 or at least one automation system 1, the rendered projection 110 or the alternative rendered projection 111 or the further rendered projection 120 may contain at least one temperature displayed in color and/or text.

With the aid of at least one energetic information from at least one drive element of the drive system 5, for example the stator module 12 and/or at least one rotor 50, 60 or at least one automation system 1, the rendered projection 110 or the alternative rendered projection 111 or the further rendered projection 120 may contain the current energy consumption and/or energy reserve for the movement and/or carrying of the rotor 50 and/or the rotor 60.

With the aid of at least one Boolean and/or numerical information from at least one automation system 1, the rendered projection 110 or the alternative rendered projection 111 or the further rendered projection 120 may include movement parameters such as tracking error and/or absolute position and/or relative position and/or velocity and/or acceleration and/or jerk of the rotor 50 or the further rotor 60.

With the aid of at least one piece of numerical information from at least one automation system 1, the rendered projection 110 or the alternative rendered projection 111 or the further rendered projection 120 may display force parameters such as a force acting upon the rotor 50 or upon the further rotor 60 or upon a drive element of the drive system 5, such as the stator module 12, and/or a torque acting upon the rotor 50 or the further rotor 60 or upon a drive element of the drive system 5, such as the stator module 12, and/or a torque acting upon the rotor 50 or the further rotor 60 or upon a drive element of the drive system 5, such as the stator module 12 and/or a torque acting upon the rotor 50 or the further rotor 60 or upon a drive element of the drive system 5 such as the stator module 12 and/or a centrifugal force acting on the rotor 50 or the further rotor 60 or on a drive element of the drive system 5 such as the stator module 12.

With the aid of at least one piece of numerical information from at least one automation system 1, the rendered projection 110 or the alternative rendered projection 111 or the further rendered projection 120 may include movement parameters such as, for example, a force and/or a torque and/or a centrifugal force.

With the aid of at least one piece of numerical information from at least one automation system 1, the rendered projection 110 or the alternative rendered projection 111 or the further rendered projection 120 may contain at least one target position for the rotor 50 or for the further rotor 60.

With the aid of at least one piece of numerical or textual information from at least one automation system 1, the rendered projection 110 or the alternative rendered projection 111 or the further rendered projection 120 may include at least one processing station and/or a parking station and/or a loading station for the rotor 50 or for the further rotor 60.

With the aid of numerical coordinate information, for example with the aid of an x-coordinate and a y-coordinate or an x-coordinate, a y-coordinate and a z-coordinate of an automation system 1 and/or information from at least one external data source, the rendered projection 110 or the alternative rendered projection 111 or the further rendered projection 120 may contain at least one map and/or navigation routes.

With the aid of at least one piece of numerical information from at least one automation system 1, the rendered projection 110 or the alternative rendered projection 111 or the further rendered projection 120 may include at least one drive element of the drive system 5, for example a stator module 12 and/or the rotor 50 and/or the further rotor 60, wherein the movement of the rendered projection 110 or the alternative rendered projection 111 or the further rendered projection 120 may be output in real time or at reduced or accelerated speed with respect to the position data and/or alignment data.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for operating an automation system,
 wherein the automation system comprises a drive system and an optical projection unit,
 wherein the drive system comprises a movable rotor, wherein the rotor is drivable with the aid of a drive, and
 wherein a control system of the automation system carries out the following steps:
 determining a position information of the rotor;
 linking the position of the rotor to an object to be displayed;
 rendering a projection to be displayed by the optical projection unit based on the position information of the rotor and the object to be displayed; and
 outputting the rendered projection to the optical projection unit, so that the optical projection unit outputs the rendered projection on a surface and/or on the rotor or a superstructure or superstructures of the rotor, and/or on transport goods of the drive system.

2. The method according to claim 1, wherein the position information is determined on the basis of a position of the rotor in relation to the automation system and/or to the drive system.

3. The method according to claim 2, wherein the position of the rotor is determined at least twice as often or three times as often, as the projection to be displayed is rendered.

4. The method according to claim 1, wherein the projection to be displayed is first calculated in a virtual figure space using at least one virtual object and then rendered for a real space using a viewing window of the figure space, wherein detection and/or perception of the rotor or the superstructure or superstructures of the rotor and/or the transported goods and/or the surface are enhanced with information from the figure space by the output rendered projection of the viewing window.

5. The method according to claim 4, wherein the position information is determined on the basis of a position of the rotor with respect to the figure space.

6. The method according to claim 4, wherein the figure space contains various elements, wherein one of the elements is selected as the object to be displayed with the aid of information from the controller and/or from the automation system and the selected element is taken into account when rendering the projection to be displayed.

7. The method according to claim 6, wherein a property is assigned to the object to be displayed in the figure space and the element is selected on the basis of the property.

8. The method according to claim 4, wherein the virtual object is moved in the figure space based on the position information of the rotor.

9. The method according to claim 1, wherein the projection to be displayed is rendered in such a way that the object to be displayed moves along with the rotor and a relative position between the rotor and the object to be displayed is fixed.

10. The method according to claim 9, wherein the object to be displayed is projected onto the rotor or next to the rotor at a predetermined distance from the rotor.

11. The method according to claim 9, wherein determining the position information, rendering the projection to be displayed and outputting the rendered projection are carried out again at least after a change in position of the rotor.

12. The method according to claim 1, wherein the object to be displayed is linked to a real measured variable of the drive system.

13. The method according to claim 1, wherein a display information is read in via an interface and the object to be displayed is selected on the basis of the display information.

14. The method according to claim 1, wherein the position information includes a distance of a rotor surface from the surface, and wherein the distance is taken into account when rendering the projection to be displayed.

15. The method according to claim 1, wherein the automation system comprises a further instance of said optical projection unit, wherein before rendering the projection to be displayed, it is determined on the basis of the position information whether the rendered projection is to be projected by the optical projection unit and/or by the further instance of said optical projection unit and this information is taken into account when rendering the projection to be displayed.

16. The method according to claim 15, wherein in a transition region the rendered projection is projected both by the optical projection unit and by the further optical projection unit.

17. A control system of a planar drive system comprising a planar stator and a rotor movable in at least two directions,
 wherein the rotor is drivable with the aid of a drive of the stator, and
 wherein the control system is configured to:
 determine a position information of the rotor;
 link the rotor to an object to be displayed, said object comprising a display information;
 render a projection to be displayed by an optical projection unit based on the position information of the rotor and the object to be displayed, wherein the projection to be displayed is generated as an image; and
 output the rendered projection to the optical projection unit, so that the optical projection unit outputs the rendered projection on a surface and/or on the rotor or a superstructure or superstructures or the rotor, and/or on transport goods of the drive system,
 wherein the position information comprises a distance of a rotor surface to a surface and wherein the distance is taken into account during rendering of the projection to be displayed.

18. An automation system comprising:
 a planar drive system, and
 an optical projection unit;
 wherein the planar drive system comprises a planar stator and a rotor movable in at least two directions,
 wherein the rotor is drivable with the aid of a drive of the stator comprising a rotor and an optical projection unit, and
 wherein a control system of the automation system is configured to:
 determine a position information of the rotor,
 link the rotor to an object to be displayed, the object comprising a display information,
 render a projection to be displayed by the optical projection unit based on the position information of the rotor and the object to be displayed, the projection to be displayed being generated an image, and
 output the rendered projection to the optical projection unit, so that the optical projection unit outputs the rendered projection on a surface and/or on the rotor or a superstructure or superstructures of the rotor, and/or on transport goods of the drive system, wherein the position information comprises a distance of a rotor surface to a surface and wherein the distance is taken into account during rendering of the projection to be displayed.

19. The automation system according to claim 18, wherein the planar drive system comprises at least one stator assembly having a plurality of coil groups for generating a stator magnetic field, a stator surface above the stator assembly and a rotor, wherein the surface corresponds to the stator surface, wherein the rotor comprises a plurality of magnet units for generating a rotor magnetic field, wherein the coil groups and the magnet units form the drive, and wherein the rotor is movable above the stator surface in parallel to the stator surface with the aid of an interaction of the stator magnetic field with the rotor magnetic field.

20. An automation system according to claim 18, wherein a data connection between the drive system, the control system and the optical projection unit is provided with the aid of a real-time capable communication bus.

* * * * *